(12) United States Patent
Motoyama et al.

(10) Patent No.: US 9,316,890 B2
(45) Date of Patent: Apr. 19, 2016

(54) PROJECTOR POSITIONING

(75) Inventors: Tetsuro Motoyama, Cupertino, CA (US); Tomohito Shimizu, Cupertino, CA (US)

(73) Assignee: Ricoh Company, Ltd., Tokyo (JP)

(*) Notice: Subject to any disclaimer, the term of this patent is extended or adjusted under 35 U.S.C. 154(b) by 562 days.

(21) Appl. No.: 13/563,941

(22) Filed: Aug. 1, 2012

(65) Prior Publication Data

US 2014/0039674 A1 Feb. 6, 2014

(51) Int. Cl.
*G03B 21/14* (2006.01)
*H04N 9/31* (2006.01)

(52) U.S. Cl.
CPC ............ *G03B 21/142* (2013.01); *H04N 9/3185* (2013.01); *H04N 9/3194* (2013.01); *G03B 21/145* (2013.01)

(58) Field of Classification Search
CPC ..... H04N 9/3194; G03B 21/14; G03B 21/145
USPC ........ 353/69, 70, 121; 345/659; 348/746, 747
See application file for complete search history.

(56) References Cited

U.S. PATENT DOCUMENTS

| | | | |
|---|---|---|---|
| 2005/0128437 A1* | 6/2005 | Pingali et al. | 353/69 |
| 2008/0204672 A1* | 8/2008 | Ikeda et al. | 353/78 |
| 2009/0207323 A1* | 8/2009 | Tamura | 348/745 |

\* cited by examiner

*Primary Examiner* — Toan Ton
*Assistant Examiner* — Ryan Howard
(74) *Attorney, Agent, or Firm* — Hickman Palermo Becker Bingham LLP; Edward A. Becker

(57) ABSTRACT

A method and apparatus is provided for identifying information to facilitate adjusting a projector's position to achieve a specified projected image on a projection surface. In an embodiment, a computing device comprising one or more sensors, which have a known spatial relationship with a projector, includes a position adjustment service configured to identify, based at least in part on the known spatial relationship between the one or more sensors and the projector, a current position of the projector relative to positions of a plurality of reference points that define a projection surface. The position adjustment service is further configured to determine a target position for the projector, determine differences between the current position of the projector and the target position for the projector, and perform one or more actions based upon the determined differences between the current position of the projector and the target position for the projector.

19 Claims, 10 Drawing Sheets

FIG. 7
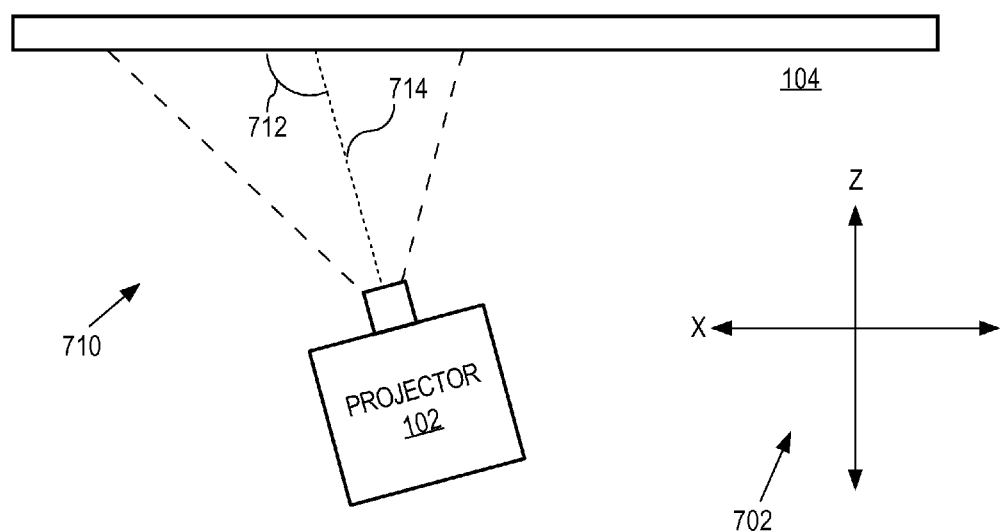
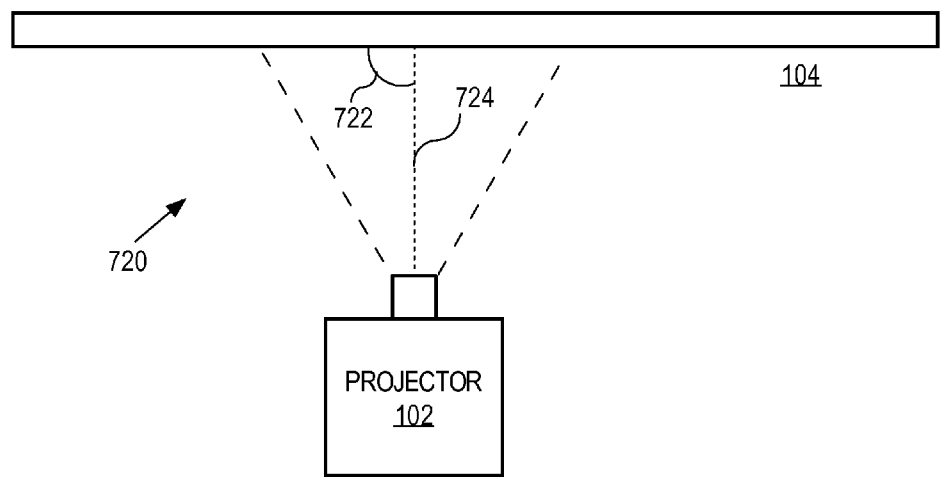

FIG. 8
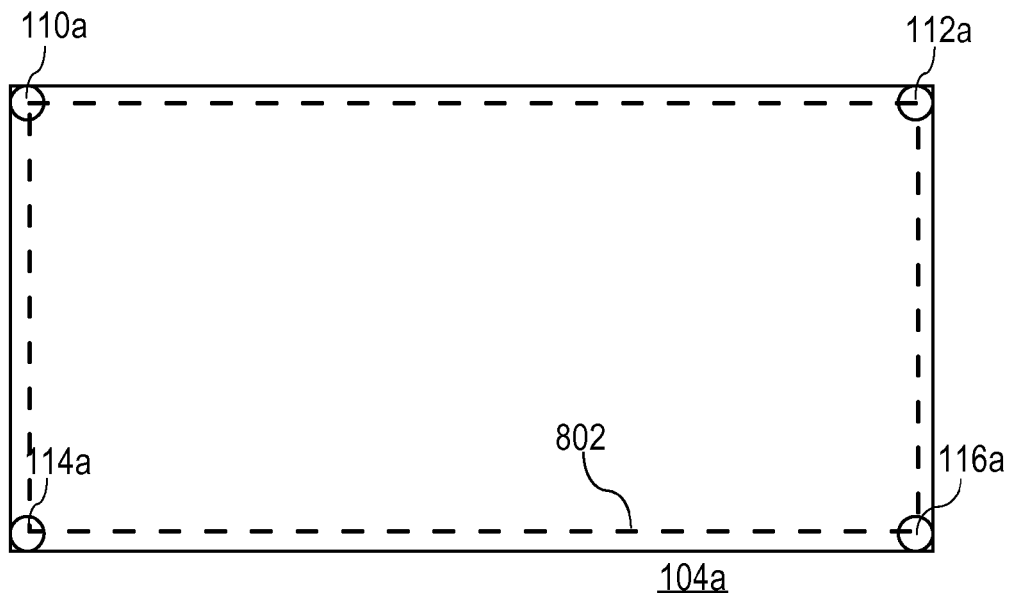
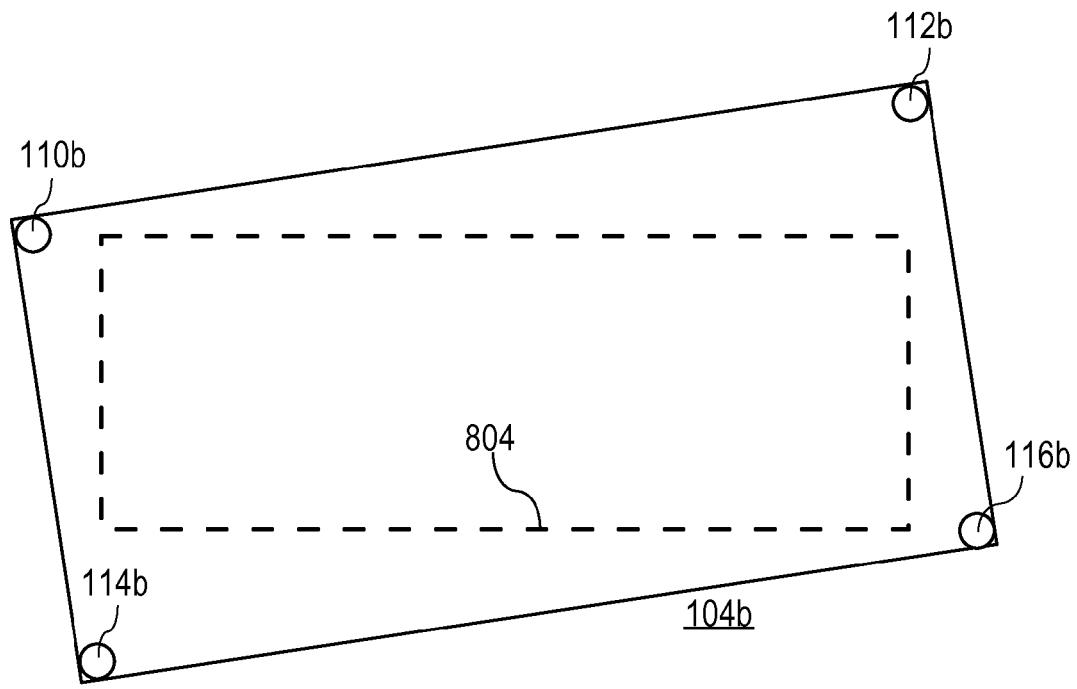

PROJECTOR POSITIONING

FIELD OF THE INVENTION

The present invention relates to projector positioning, and more specifically, to automatically determining a target position for a projector and differences between the current position of the projector and the target position for the projector.

BACKGROUND

A projector is a device that projects an image onto a surface—generally a wall, a screen, etc.—which allows the projected image to be enlarged and displayed. Projectors are commonly used to aid a presenter giving a presentation to a group of people by projecting images associated with the presentation onto a projection surface for the group of people to see.

Many projectors are portable. The position of a portable projector must be adjusted such that the image projected by the projector is properly displayed on the desired projection surface. If a projector is positioned improperly, the projected image can be distorted or otherwise less-optimally displayed.

One kind of portable projector is an ultra-short range projector, which is positioned very near the projection surface. Using an ultra-short range projector, a presenter can stand in front of and near the projection surface without interfering with a projected image. For example, Ricoh PJ WX 4130/PJ WX 4130N is an ultra-short range projector that is optimally placed from between 4.6 and 9.8 inches from the desired projection surface. Because of the proximity of an ultra-short range projector to the projection surface, a projected image from such a projector is especially sensitive to small positioning adjustments.

It may be difficult to manually adjust a portable projector, especially a portable ultra-short range projector, to a position that allows for optimal projected image quality. For example, a user may place a portable projector on a table in front of the desired projection surface and find that the projector is too low to the ground. The user may attempt to adjust the height of the projector using books or other objects. However, finding just the right combination of objects to elevate the projector to the optimal height can be difficult. Furthermore, the user may have to find another table altogether if the projector is too high for the projection surface when the projector is placed upon the table. Such positioning problems also extend to the rotation and tilt of the projector, as well as to the distance between the projector and desired projection surface.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An approach is provided for identifying information to facilitate adjusting the position of a projector to achieve a specified projected image, e.g., the largest possible projected image, on a projection surface. In an embodiment, a computing device comprising one or more sensors, which have a known spatial relationship with a projector, includes a position adjustment service configured to identify, based at least in part on the known spatial relationship between the one or more sensors and the projector, a current position of the projector relative to positions of a plurality of reference points that define a projection surface. The position adjustment service is further configured to determine a target position for the projector, determine differences between the current position of the projector and the target position for the projector, and perform one or more actions based upon the determined differences between the current position of the projector and the target position for the projector. The approach may be implemented as a computer-implemented method, by an apparatus, system or device, or by a computer-readable medium storing instructions which, when processed by one or more processors, implements the approach.

BRIEF DESCRIPTION OF THE DRAWINGS

In the drawings:

FIG. 7 depicts a projector projecting an image onto a projection surface.

FIG. 8 depicts the largest possible image area for a projected image given a bounding box formed by placement of various signal transmitters on the projection surface.

DETAILED DESCRIPTION

Figure 1:
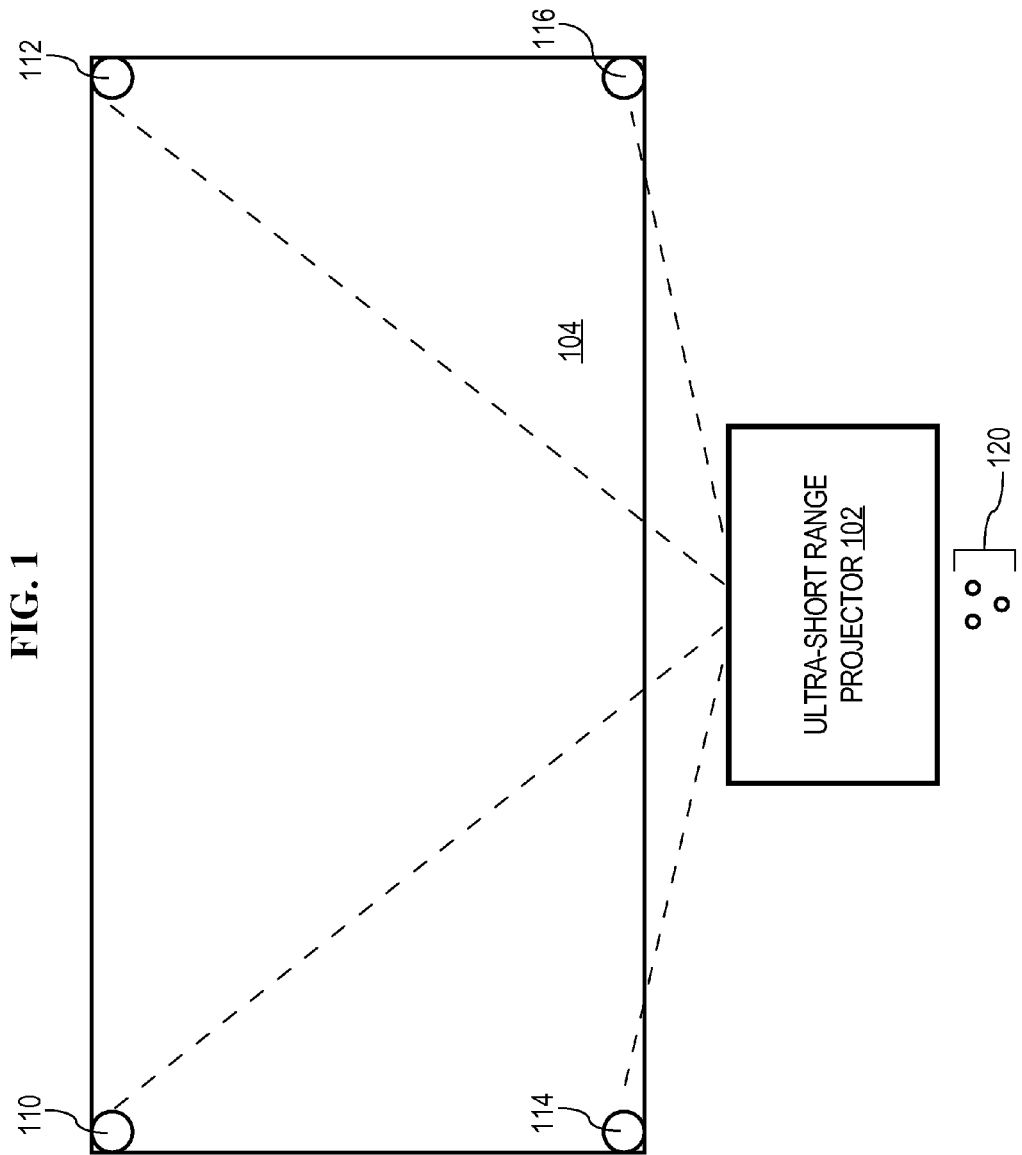
FIG. 1 depicts an example ultra-short range projector projecting an image onto a projection surface from below and near the projection surface.

In the following description, for the purposes of explanation, numerous specific details are set forth in order to provide a thorough understanding of the present invention. It will be apparent, however, that the present invention may be practiced without these specific details. In other instances, well-known structures and devices are depicted in block diagram form in order to avoid unnecessarily obscuring the present invention.

General Overview

An approach is provided for identifying information to facilitate adjusting the position of a projector to achieve a specified projected image, e.g., the largest possible projected image, on a projection surface. In an embodiment, a computing device comprising one or more sensors that have a known spatial relationship with a projector includes a position adjustment service configured to identify, based at least in part on the known spatial relationship between the one or more sensors and the projector, a current position of the projector relative to positions of a plurality of reference points that define a projection surface. The position adjustment service is further configured to determine a target position for the projector, determine differences between the current position of the projector and the target position for the projector, and perform one or more actions based upon the determined differences between the current position of the projector and the target position for the projector.

In an embodiment, the computing device is communicatively coupled to a display device. In such embodiments, the one or more actions comprise formulating one or more instructions for adjusting the current position of the projector to the target position for the projector based, at least in part, on the determined differences between the current position of the projector and the target position for the projector, and causing the one or more instructions to be displayed at the display device.

In another embodiment, the computing device is communicatively coupled to the projector. In such embodiments, the one or more actions comprise formulating one or more instructions for adjusting the current position of the projector to the target position for the projector based, at least in part, on the determined differences between the current position of the projector and the target position for the projector, capturing the one or more instructions in an instructions image, and causing the instructions image to be projected by the projector.

In yet another embodiment, the computing device is communicatively coupled to a projector position adjusting robot. In such embodiments, the one or more actions comprise instructing the projector position adjusting robot to adjust the current position of the projector to be the target position for the projector based, at least in part, on the determined differences between the current position of the projector and the target position for the projector.

In yet another embodiment, the computing device further comprises a projector position adjusting robot, and the one or more actions comprise causing the projector position adjusting robot to adjust the current position of the projector to be the target position for the projector based, at least in part, on the determined differences between the current position of the projector and the target position for the projector.

In yet another embodiment, the one or more sensors are embedded in a projector stand, and the projector stand comprises a projector-stabilizing member configured to maintain the projector in the known spatial relationship with the one or more sensors.

In yet another embodiment, the position adjustment service is further configured to retrieve information indicating a center of projection for the projector, wherein identifying the target position for the projector is based on the current position of the projector, and the information indicating the center of projection for the projector.

In yet another embodiment, the target position comprises an optimal distance attribute that indicates an optimal distance between the projector and the projection surface. In such embodiments, the position adjustment service is further configured to retrieve projector information indicating: a maximum size of a projected image for the projector; and a certain distance between the projection surface and the projector for the maximum size of the projected image. Also, the position adjustment service is further configured to calculate a bounding box for the projected image based, at least in part, on the positions of the plurality of reference points that define the projection surface, identify a target area, for the projected image, that is within the bounding box, wherein the target area is at most the maximum size of the projected image, and calculate the optimal distance attribute of the target position based, at least in part, on the target area for the projected image and the certain distance in the retrieved projector information.

In yet another embodiment, the target position is a position at which a projected image from the projector has the largest possible size, which is less than a maximum size of a projected image for the projector and within the bounding box calculated, based, at least in part, on the positions of the plurality of reference points that define the projection surface.

Architecture for Defining a Projection Surface

FIG. 1 depicts an example ultra-short range projector 102 projecting an image onto a projection surface 104. Because projector 102 is an ultra-short range projector, it is depicted as projecting from below and near projection surface 104. Embodiments are described in connection with projector 102 because images projected from an ultra-short range projector are especially sensitive to small changes in the position of the projector. However, embodiments may be implemented with any kind of projector that projects images onto a projection surface.

FIG. 1 further depicts signal transmitters 110-116 affixed to projection surface 104. These signal transmitters act as reference points to define projection surface 104, and are placed, by a user, at the four corners of the desired area of the projection surface on which an image is to be projected. Signal transmitters 110-116 may be affixed to projection surface 104 in any manner, including using temporary attachment mechanisms such as suction cups, removable adhesive, glue, tape, magnets, etc. Signal transmitters 110-116 may be Radio-Frequency IDentification (RFID) tags, or may employ other technology to transmit or reflect a signal that is detectable by sensors 120. Each of signal transmitters 110-116 may transmit a signal with an identifier that is unique with respect to the group of signal transmitters 110-116.

Sensors 120 are one or more sensors that detect a signal transmitted or reflected by signal transmitters 110-116. Sensors 120 have a known spatial relationship with projector 102, i.e., the position of projector 102 relative to the position of sensors 120 is known. The known spatial relationship between projector 102 and sensors 120 may be accomplished by any number of mechanisms. In one embodiment, sensors 120 are included in the body of projector 102. In another embodiment, sensors 120 are permanently attached to projector 102 or to a structure supporting projector 102 (such as projector adjustment table 200 of FIG. 2 described in further detail below).

In yet another embodiment, sensors 120 are temporarily attached by a user to particular positions on projector 102 or on a structure supporting projector 102. Users may be provided with instructions or diagrams indicating the particular attachment positions for sensors 120 to ensure that the position of sensors 120 with respect to the position of projector 102 is known. For example, a user may be provided with instructions to attach sensors 120 to particular marks on the body of projector 102. As another example, a user may be provided with instructions to place projector 102 onto a structure in a particular position on the structure and to attach sensors 120 to the structure supporting projector 102 in a configuration indicated in a diagram (thus creating a known spatial relationship between sensors 120 and projector 102).

In another embodiment, sensors 120 may be embedded in a carrier that maintains sensors 120 themselves in a known spatial configuration. Such a carrier may be made from plastic, metal, cloth, etc. To illustrate, the user may be instructed place projector 102 on a table such that the front edge of the projector is aligned with and flush to the front edge of the table. The user is further instructed to hang the sensor carrier with sensors 120 from the edge of the table with which projector 102 is flush. This allows sensors 120 to detect signals from a projection surface (104) toward which projector 102 is oriented. According to this example, the user is further instructed to align the center of the carrier with the center of projector 102 such that the position of sensors 120 is known relative to the position of projector 102.

Projector Position Adjustment Table

Figure 2:
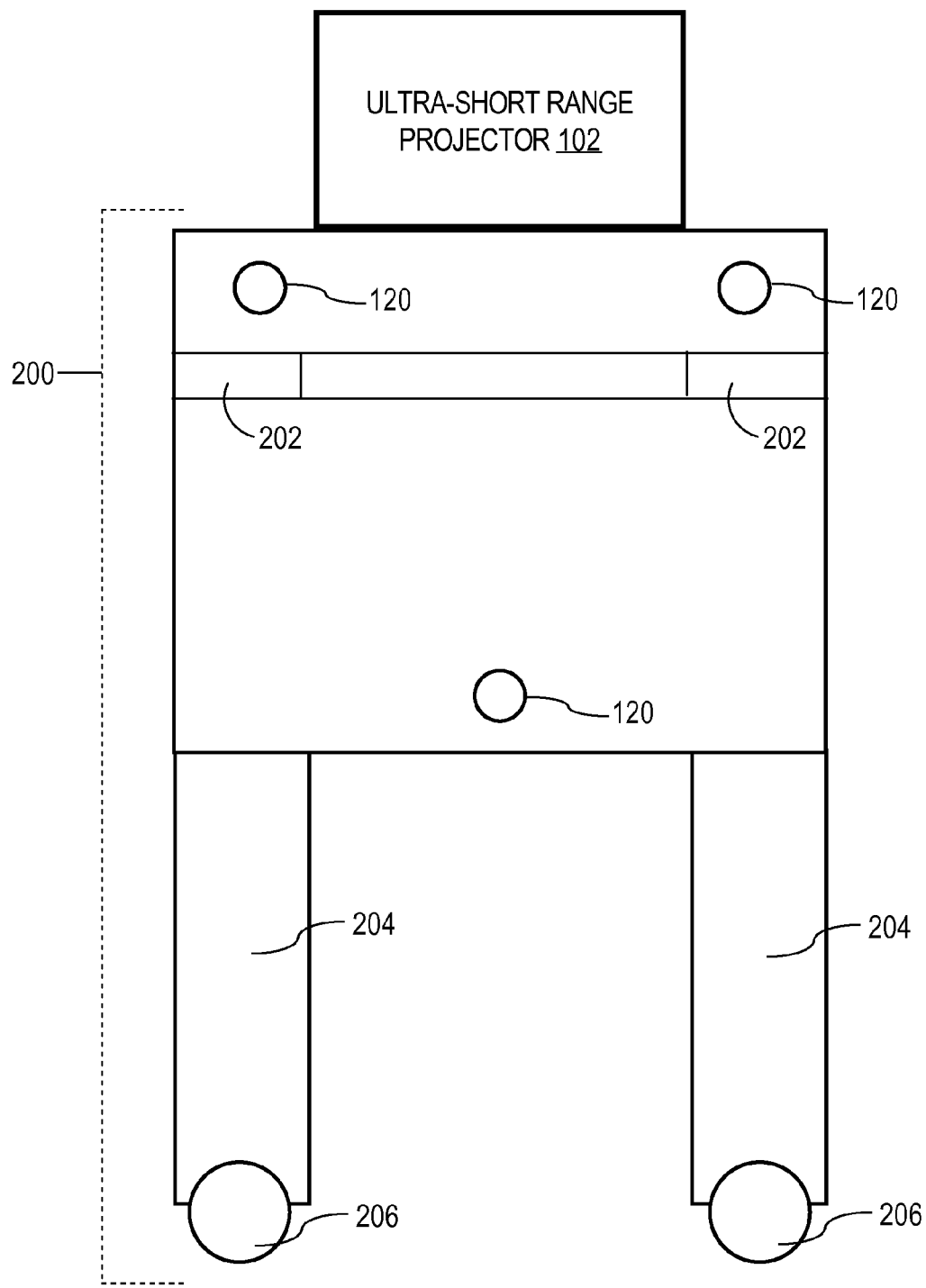
FIG. 2 depicts a projector adjustment table.

FIG. 2 depicts a projector adjustment table 200 that supports projector 102, according to certain embodiments. Projector adjustment table 200 includes a projector positioning mechanism (not depicted) to maintain projector 102 in a particular position on table 200. For example, the surface of projector adjustment table 200 on which projector 102 rests may include one or more projector-stabilizing members such as one or more clamps to hold projector 102 in place, holes in which protrusions from projector 102 may rest, etc. Thus, projector adjustment table 200 holds projector 102 in a known position relative to the positions of sensors 120 affixed to table 200, according to embodiments.

Projector adjustment table 200 includes features for adjusting the position of projector 102 including minor height adjusters 202 (e.g., one at each corner of table 200), one or more adjustable height legs 204, and stoppable wheels 206 at the end of the one or more adjustable height legs 204. (Embodiments are not limited to any particular number of minor height adjusters 202, legs 204, or wheels 206.) According to further embodiments, projector adjustment table 200 also includes minor rotation adjusters (not depicted in FIG. 2), which allow the user to rotate projector 102 from left to right in small increments. Projector adjustment table 200 may also contain space to store projector 102 and signal transmitters 110-116 for the user's convenience.

Adjusting Projector Position Adjustment Table

In one embodiment, the adjustable features of projector adjustment table 200 are manually adjustable and projector adjustment table 200 includes mechanisms by which a user may adjust each of the adjustable features. For example, each adjustable feature may be associated with a knob or lever that, when moved, adjusts the corresponding feature. In another embodiment, one or more of the adjustable features of projector adjustment table 200 are automatically adjusted by a computing device, as described in further detail below.

Figure 3:
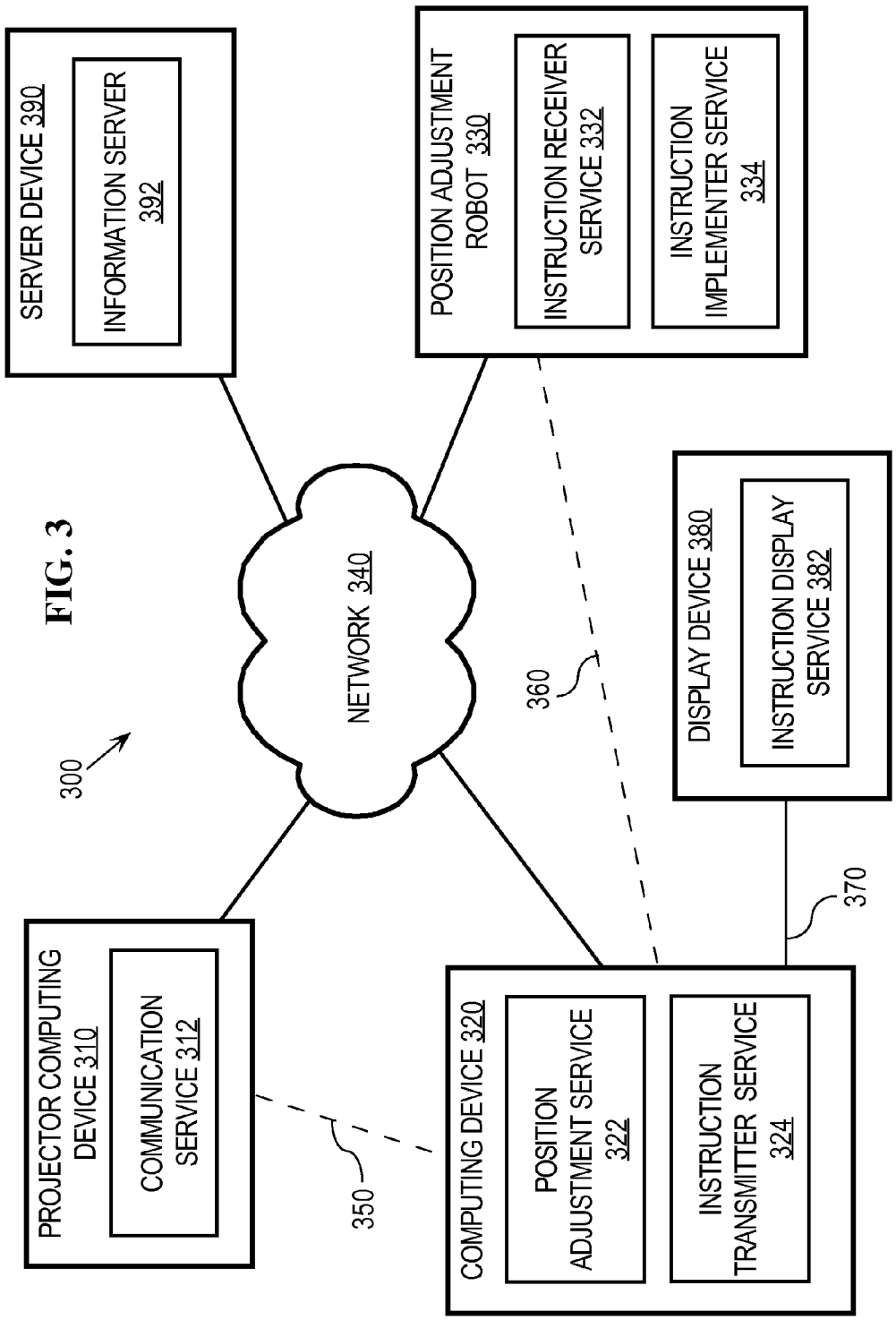
FIG. 3 is a block diagram that depicts an example device arrangement for identifying information to facilitate adjusting the position of a projector to achieve a specified projected image on a projection surface.

Architecture for Identifying Information to Facilitate Adjusting a Projector's Position FIG. 3 is a block diagram that depicts an example device arrangement 300 for identifying information to facilitate adjusting the position of projector 102 to achieve a specified projected image, e.g., the largest possible projected image, on projection surface 104, according to embodiments. Example device arrangement 300 includes a display device 380, and also a projector computing device 310, a computing device 320, a position adjustment robot 330, and a server device 390 that are communicatively coupled via a network 340, according to embodiments. The network connection may be a direct connection or via a device (such as projector computing device 310) through communication link 350, 360 or 370. Furthermore, projector computing device 310 and computing device 320 may be communicatively coupled via communication link 350. Also, position adjustment robot 330 and computing device 320 may be communicatively coupled via communication link 360. Further, computing device 320 and display device 380 may be communicatively coupled via communication link 370. Device arrangement 300 may include other devices and technologies according to a particular implementation. Services and servers depicted in example device arrangement 300 may be implemented by one or more processes running on the associated devices.

Projector computing device 310 may be implemented by any type of computing device that is capable of communicating with computing device 320 via communication link 350 and/or via network 340. For example, Ricoh PJ WX4130N may function as projector computing device 310, and has USB, wireless, and Ethernet connections. Projector computing device 310 is integrated with projector 102 (FIG. 1) according to certain embodiments. In example device arrangement 300, projector computing device 310 is configured with communication service 312, which receives requests for information and transmits responses to the requests for information via communication link 350 and/or via network 340, as described in further detail below. Projector computing device 310 may be configured with other mechanisms, processes and functionalities, depending upon a particular implementation.

Computing device 320 may be implemented by any type of computing device that is capable of communicating with projector computing device 310, position adjustment robot 330, display device 380, and/or server device 390 via the applicable communication channels. According to certain embodiments, computing device 320 may perform one or more functions and have one or more features herein attributed to any of projector computing device 310, position adjustment robot 330, display device 380, and server device 390.

In example device arrangement 300, computing device 320 is configured with position adjustment service 322 and instruction transmitter service 324. Position adjustment service 322 determines a target position for projector 102 and identifies difference between the current position of projector 102 and the target position for projector 102, as described in further detail below. Instruction transmitter service 324 is configured to communicate with other processes and devices. Computing device 320 may be configured with other mechanisms, processes and functionalities, depending upon a particular implementation.

Position adjustment robot 330 may be implemented by any type of device, including a computing device, that is capable of adjusting the position of projector 102 according to instructions formulated by position adjustment service 322. In example device arrangement 300, position adjustment robot 330 is configured with instruction receiver service 332 for receiving instructions from position adjustment service 322, and instruction implementer service 334 for implementing the received instructions, as described in further detail below. Position adjustment robot 330 may be configured with other mechanisms, processes and functionalities, depending upon a particular implementation.

Display device 380 may be implemented by any type of device that is capable of displaying information from position adjustment service 322. For example, display device 380 may be a monitor, a screen on a computing device such as computing device 320, etc. In example device arrangement 300, display device 380 is configured with instruction display service 382 for displaying instructions received from position adjustment service 322, as described in further detail below. According to embodiments, display device 380 is part of projector adjustment table 200. Display device 380 may be configured with other mechanisms, processes and functionalities, depending upon a particular implementation.

Network 340 may be implemented with any type of medium and/or mechanism that facilitates the exchange of information between two or more of projector computing device 310, computing device 320, position adjustment robot 330, and server device 390. Furthermore, network 340 may use any type of communications protocol, and may be secured or unsecured, depending upon the requirements of a particular embodiment.

Server device 390 may be implemented by any type of device that is capable of communicating with projector computing device 310 and/or computing device 320 over network 340. In example device arrangement 300, server device 390 is configured with information server 392 that communicate with other processes and devices, as described in further detail below. Server device 390 may be configured with other mechanisms, processes and functionality, depending upon a particular implementation.

Communication links 350, 360, and 370 may be implemented by any kind of physical or wireless connection that facilitates communication between devices, including Bluetooth, infrared, USB ports, serial ports, Firewire, etc. Sensors 120 (FIG. 1) may also be connected to computing device 320 via a communication link such as communication link 350, 360, or 370.

Figure 4:
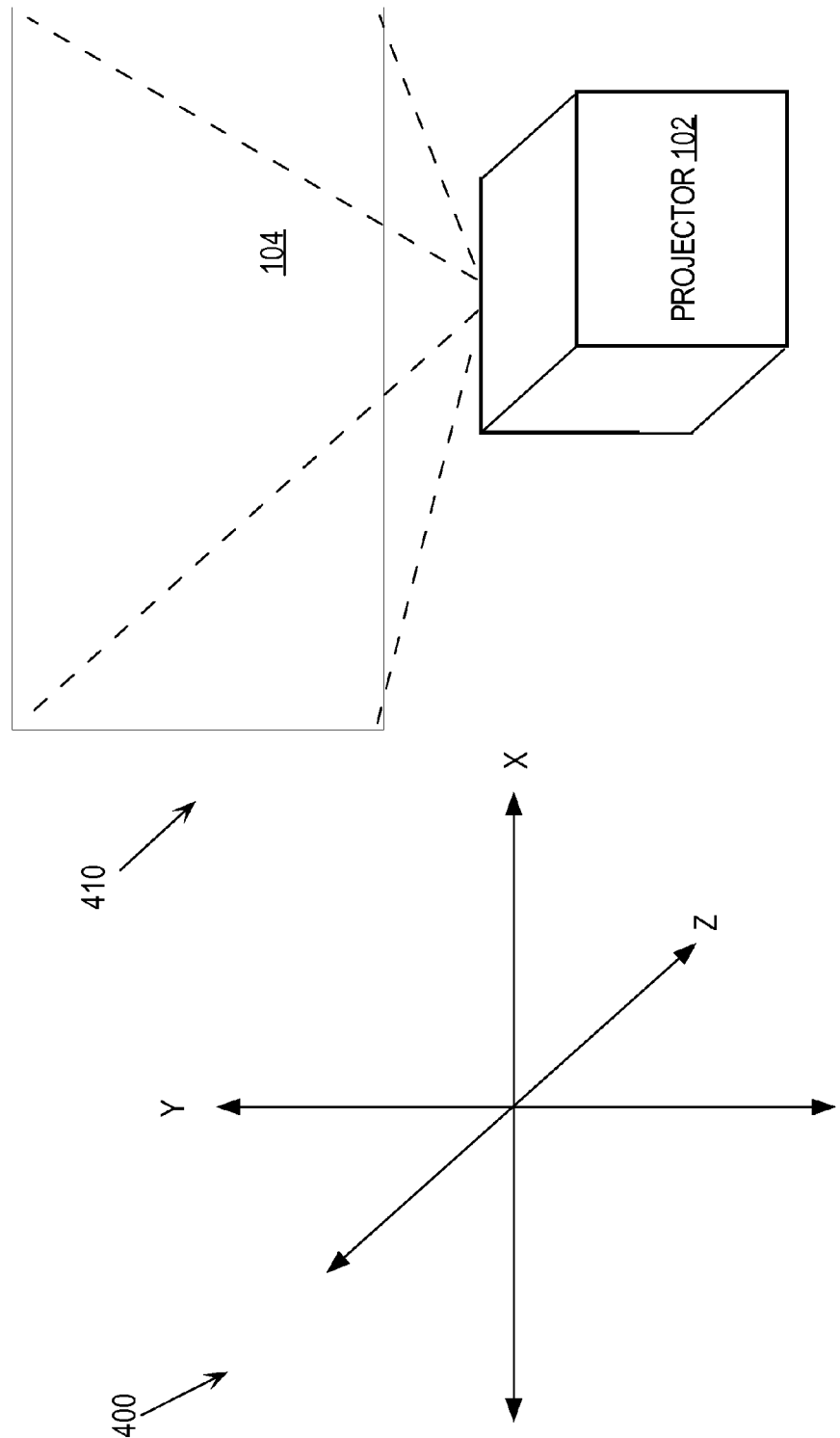
FIG. 4 depicts axes with respect to which a projector may be adjusted.

Determining Differences Between the Current Position of the Projector and a Target Position for the Projector To facilitate the description herein of adjusting the position of projector 102, FIG. 4 depicts axes 400 with respect to which projector 102 may be adjusted. Axes 400 are defined relative to projector 102. As depicted in scene 410 of FIG. 4, projection surface 104 lies on the XY plane when the front edge of projector 102 is parallel to projection surface 104.

Figure 5:
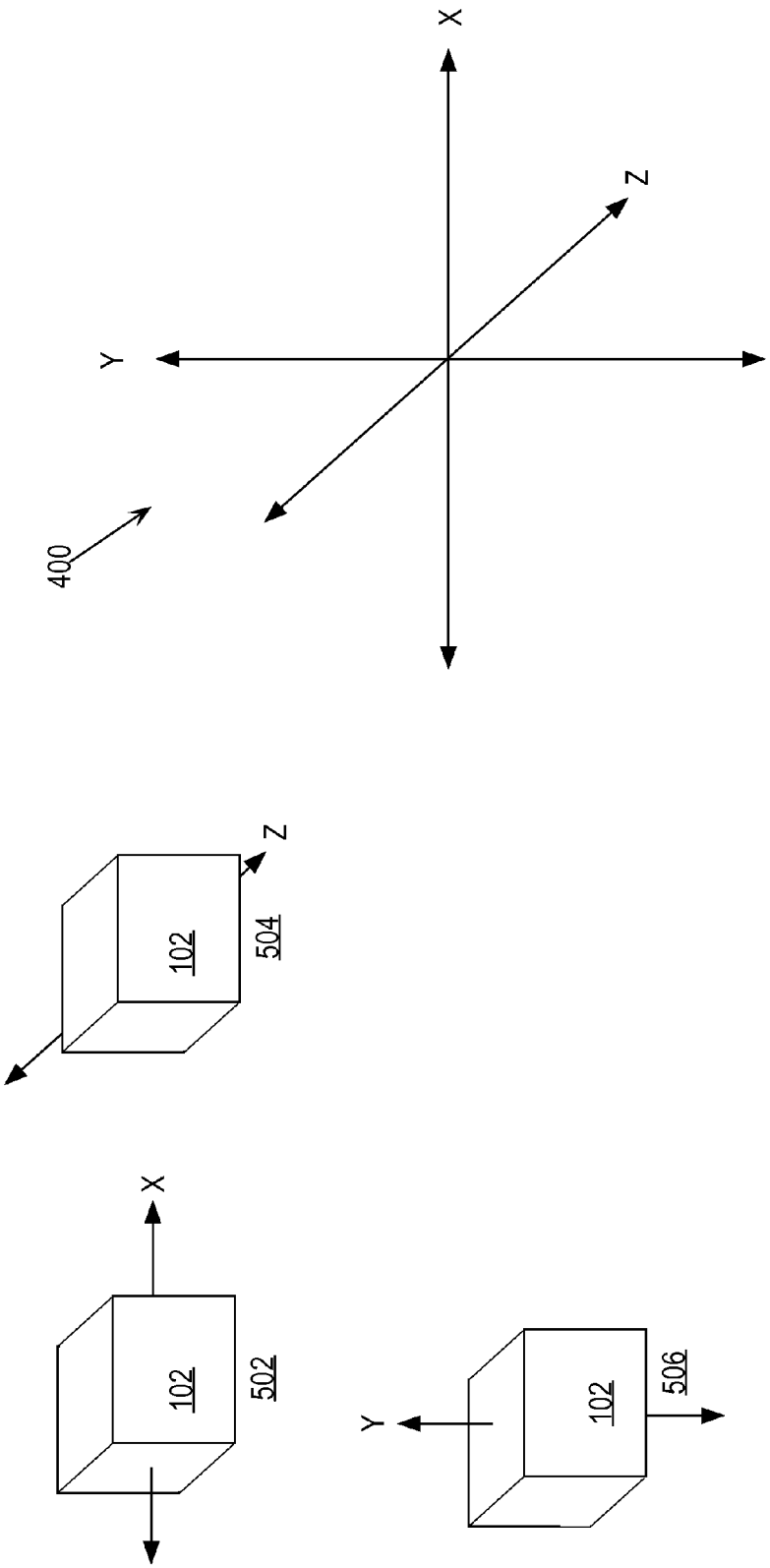
FIG. 5 depicts movement of a projector along various axes.

FIG. 5 depicts movement of projector 102 along axes 400 and assumes that the front of projector 102 is facing projection surface 104 as depicted in scene 410 of FIG. 4. As depicted in FIG. 5, moving projector 102 along the Z axis (scene 504) brings projector 102 closer to or farther away from projection surface 104. Moving projector 102 along the X axis (502) shifts projector 102 to the right and left with respect to projection surface 104. Moving projector 102 along the Y axis (506) shifts projector 102 higher and lower with respect to projection surface 104. Rotating projector 102 about the X, Y, and Z axes is also described herein.

Figure 6:
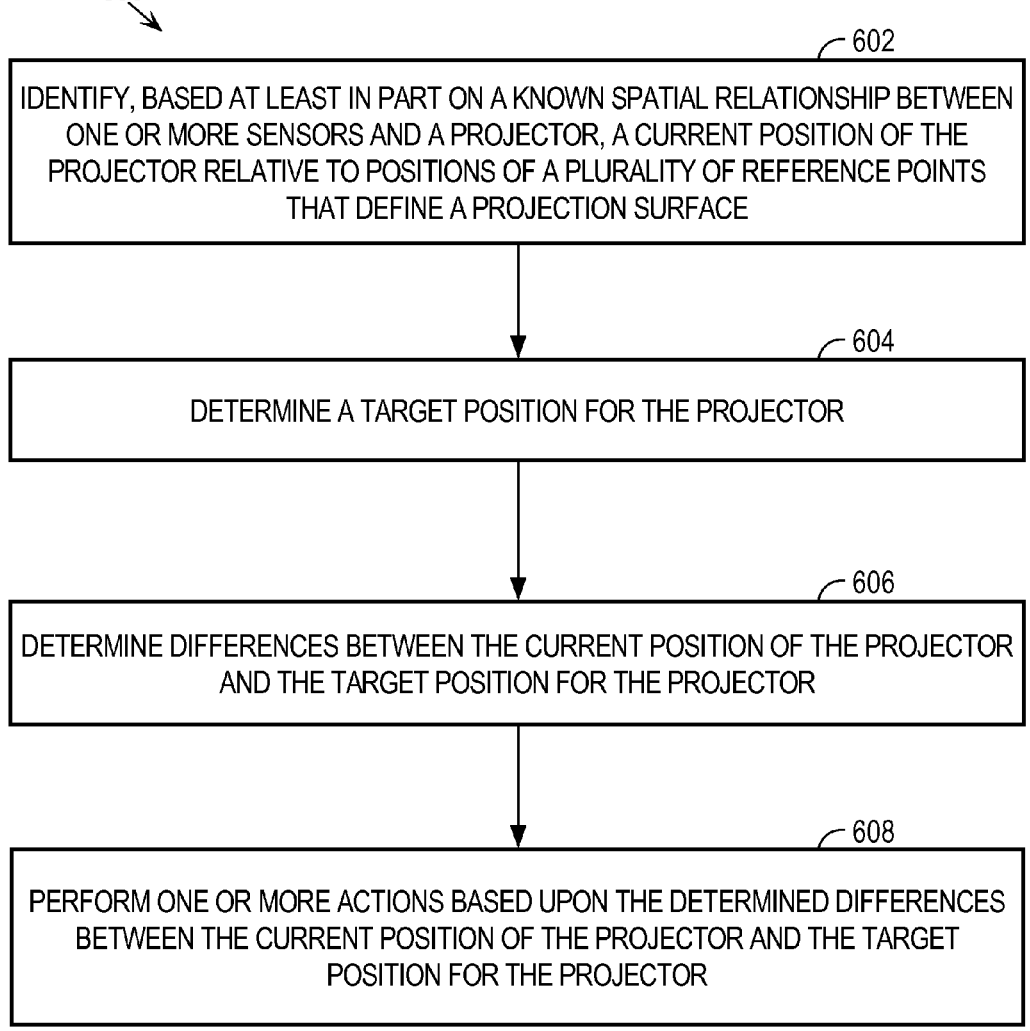
FIG. 6 depicts a flowchart for performing actions based on differences between a current position of a projector and a determined target position for the projector.

FIG. 6 depicts a flowchart 600 for providing information to facilitate positioning projector 102 based on differences determined between a current position of projector 102 and a determined target position for projector 102.

At step 602, a current position of a projector—relative to positions of a plurality of reference points that define a projection surface—is identified based, at least in part, on a known spatial relationship between one or more sensors and the projector. To illustrate, the current position of projector 102 has multiple aspects associated therewith, including whether projector 102 is rotated about one or more axes, the location of the center of projection for projector 102 with respect to the center of a bounding box created by the positions of signal transmitters 110-116, and the distance between projector 102 and projection surface 104. Identifying the current position of projector 102 includes calculating one or more of these aspects.

In order to calculate the current position of projector 102, position adjustment service 322 identifies the positions of signal transmitters 110-116 placed to define projection surface 104 and retrieves projector information for projector 102. Position adjustment service 322 bases the calculation of the current position of projector 102 on the positions of signal transmitters 110-116 sensed by sensors 120, the retrieved projector information, and the known spatial relationship between sensors 120 and projector 102.

To illustrate, a user places signal transmitters 110-116 at the four corners of projection surface 104 on which the user wishes to project an image from projector 102. Such a surface is generally a large, upright, flat surface such as a wall, a white board, a chalkboard, etc.

The user may then activate a control to initiate position adjustment service 322 of computing device 320. For example, the control may be a control on a graphical user interface displayed at display device 380, and activation of the control is communicated to position adjustment service 322 via communication link 370. As a further example, the control may be a physical button on projector 102, and projector computing device 310 detects activation of the button and communicates this activation to position adjustment service 322. As yet another example, computing device 320 may be integrated into projector adjustment table 200 (FIG. 2), and the control is a button on projector adjustment table 200 and activation of the button is detected by computing device 320.

Once position adjustment service 322 is initiated, position adjustment service 322 retrieves projector information for projector 102. The projector information includes one or more of the center of projection for projector 102 (which is based on the position of the projection lens on projector 102), prescribed maximum and prescribed minimum projected image sizes for the projector model of projector 102, and the distance between projector 102 and projection surface 104 prescribed to produce each of the maximum and minimum projected image sizes.

According to one embodiment, position adjustment service 322 retrieves the projector information from projector computing device 310.

According to other embodiments, position adjustment service 322 determines a model identifier for projector 102, which uniquely identifies the model of projector being used. Position adjustment service 322 may determine a model identifier for projector 102 based on one or more of: a stabilizing mechanism, uniquely associated with a particular projector model, being used to hold projector 102 in place on table 200; projector model information from the user retrieved via a graphical user interface at display device 380; a query directed to projector computing device 310; taking a picture of a code or model name displayed on projector 102 (e.g., taking a picture of a QR code with camera functionality of computing device 320) and determining a model identifier based on the resulting image; etc.

In this embodiment, position adjustment service 322 retrieves the projector information for projector 102 using the model identifier of projector 102. Position adjustment service 322 may retrieve the projector information from a database at computing device 320 (not depicted in FIG. 3) or may retrieve the needed information from information server 392 at server device 390. For example, information server 392 has access to a database of information about models of projectors indexed by model identifiers. When information server 392 receives a request for information about a particular model identifier from position adjustment service 322, information server 392 retrieves projector information for the model identifier from the database and sends that projector information back to position adjustment service 322.

Position adjustment service 322 also causes sensors 120 to detect the positions of signal transmitters 110-116, including how far away each of signal transmitters 110-116 are from sensors 120. In one embodiment, sensors 120 include three sensors that triangulate the position of each signal transmitter based on the signal strength coming from each respective signal transmitter.

Position adjustment service 322 calculates whether projector 102 is rotated with respect to projection surface 104. In other words, using the determined positions of signal transmitters 110-116, position adjustment service 322 determines whether the front edge of projector 102 is parallel to projection surface 104. To illustrate, FIG. 7 depicts projector 102 projecting an image onto projection surface 104 displayed from the top, at a cross section on the XZ plane (as depicted by axes 702). In this example, the Y axis would be coming out of the paper toward the reader. In scene 710, the front edge of projector 102 is not parallel to projection surface 104, as indicated by obtuse angle 712 between the center line of projection 714 from projector 102 and projection surface 104. In fact, projector 102 is rotated about the Y axis to the left in scene 710. In scene 720, the front edge of projector 102 is parallel to projection surface 104, as indicated by right angle 722 between the center line of projection 724 of projector 102 and projection surface 104.

Similarly, projector 102 may be improperly rotated about the X axis and/or Z axis with respect to projection surface 104. The example above assumes that the proper angle between the center line of projection from projector 102 and projection surface 104 is a right angle. However, according to embodiments, information about optimal angles between the center line of projection from projector 102 and projection surface 104—with respect to one or more of the X, Y, or Z axes—may be included in the retrieved projector information for projector 102.

According to embodiments, position adjustment service 322 calculates rotation about one or more of the axes based on information from a tilt sensor inside table 200. Tilt sensor information may be based on gravity, or any other technology used to determine the tilt of an object.

Going back to step 602, position adjustment service 322 identifies one or more aspects of the current position of projector 102, including angles between the center line of projection of projector 102 and each of the X axis, the Y axis, and the Z axis, how far from the center of a bounding box formed by the positions of signal transmitters 110-116 is the center of projection of projector 102, and the distance between projection surface 104 and projector 102.

Determining a Projector's Target Position

At step 604, a target position for the projector is determined. For example, position adjustment service 322 calculates a target position for projector 102 to project a specified projected image, e.g., the largest possible projected image, within a bounding box formed by the positions of signal transmitters 110-116. A user may instruct position adjustment service 322 to calculate the target position for projector 102 to create the largest possible projected image from projector 102 within the bounding box formed by the positions of signal transmitters 110-116. Such a largest possible image may also be limited by the prescribed maximum size for a projected image included in the projector information retrieved for projector 102. Embodiments are described herein with the target position calculated to achieve the largest possible projected image, but the embodiments are not limited thereby.

FIG. 8 depicts the largest possible image area for a projected image given a bounding box formed by placement of signal transmitters 110-116 on projection surface 104. Specifically, FIG. 8 depicts a bounding box 802, on projection surface 104a, formed by the positions of signal transmitters 110a-116a. FIG. 8 also depicts a bounding box 804, on projection surface 104b, formed by the positions of signal transmitters 110b-116b. In the embodiment of projection surface 104b, a projected image is automatically adjusted to be parallel with the ground. Whether the projected image is parallel to the ground may be calculated based, at least in part, on information from the tilt sensor included in table 200.

One aspect of the target position is the projection angle of projector 102 relative to projection surface 104. The target angle of projection for projector 102 may be set, by default, to right angles for one or more of axes X, Y, and Z. As previously mentioned, the target angle of projection for 102 may be included in the retrieved projector information for projector 102 for one or more of axes X, Y, and Z.

Another aspect of the target position for projector 102 is centering the projected image in the bounding box formed by the positions of signal transmitters 110-116 on projection surface 104. Bounding box 802 is used herein as a non-limiting example of a bounding box formed by the positions of signal transmitters 110-116 on projection surface 104 for ease of explanation.

Yet another aspect of the target position for projector 102 is the optimal distance between projector 102 and projection surface 104 to project a specified projected image, e.g., the largest possible projected image, within bounding box 802.

In one embodiment, position adjustment service 322 identifies all of the aspects of the target position at once. In another embodiment, position adjustment service 322 determines a subset of the aspects of the target position for projector 102, then proceeds through steps 606 and 608 of flowchart 600 with regard to only that subset of aspects of the target position. Once flowchart 600 is completed with respect to the subset of aspects of the target position, position adjustment service 322 may restart flowchart 600 with regard to another particular one or more of the aspects of the target position, which may include one or more of the aspects in the first subset of aspects of the target position.

For example, position adjustment service 322 may perform steps 602-608 of flowchart 600 with respect to only rotational aspects of the target position of projector 102. Position adjustment service 322 may then perform steps 602-608 of flowchart 600 with respect to shifting projector 102 along one or more axes. Position adjustment service 322 may then perform steps 602-608 of flowchart 600 with respect to the optimal distance between projector 102 and projection surface 104 (i.e., movement along the Z axis). This is a non-limiting example, and any combination of the aspects (or sub-aspects such as rotation about a particular axis) of the target position of projector 102 may be calculated at any time and in any order according to certain embodiments.

To calculate the optimal distance between projector 102 and projection surface 104, position adjustment service 322 identifies the smaller of (a) an image with the correct ratio for projector 102 circumscribed within bounding box 802, and (b) the maximum prescribed image size for projector 102 identified in the information for the model identifier of projector 102. An image that is circumscribed within bounding box 802 is an image, e.g., the largest image, that fits within bounding box 802 while retaining the proper image aspect ratio.

If the maximum prescribed image size is smaller, then the maximum prescribed image size is the optimal size for an image projected from projector 102. In this case, the optimal distance between projector 102 and projection surface 104 is the distance included in the information for projector 102 in connection with that maximum prescribed size.

If an image circumscribed within bounding box 802 is smaller than the maximum prescribed image size, then the optimal size of a projected image is the image circumscribed within bounding box 802. In this case, position adjustment service 322 determines the optimal distance by dividing the size of image, circumscribed by bounding box 802, by a ratio of (a) the maximum prescribed image size to (b) the distance between projector 102 and projection surface 104 associated with the maximum prescribed image size. In other words, position adjustment service 322 calculates the optimal distance between projector 102 and projection surface 104 using a formula such as: Min Distance+(Max Distance−Min Distance)*(Size of target screen−Min screen)/(Max screen−Min screen) if the distance between projector 102 and projection surface 104 is proportional to the size of the image being projected from projector 102. If the distance is not proportional to the projected image size, a special function shall be used.

In an embodiment, if the size of the image circumscribed by bounding box 802 is smaller than the minimum prescribed image size for projector 102, then position adjustment service 322 displays a notice at display device 380 stating that projection surface 104 is smaller than recommended. The displayed notice may also include the recommended minimum size for a projected image from projector 102 and/or the minimum prescribed distance between projector 102 and projection surface 104.

At step 606, differences between the current position of the projector and the target position for the projector are determined. For example, position adjustment service 322 may identify how far projector 102 needs to be rotated about each axis in order to make the angle of projection from projector 102 the optimal angle for each axis. Position adjustment service 322 may identify how far projector 102 should shift along the X and/or Y axis in order to bring the center of the projected image to the center of bounding box 802. Position adjustment service 322 may identify how far projector 102 should shift along the Z axis in order to make the distance between projector 102 and projection surface 104 the calculated optimal distance.

Actions Taken to Adjust a Projector's Position

At step 608, one or more actions are performed based upon the determined differences between the current position of the projector and the target position for the projector.

In one embodiment in which computing device 320 is coupled to display device 380, position adjustment service 322 formulates, and causes to be displayed at display device 380, one or more instructions for adjusting the current position of projector 102 to the target position for projector 102 based, at least in part, on the determined differences between the current position of projector 102 and the target position for projector 102.

In an example of formulating instructions for adjusting table 200 (either automatically, or manually), position adjustment service 322 determines that projector 102 needs to be shifted along the Y axis in order to attain the target position for projector 102. If the size of the needed shift is above a threshold, position adjustment service 322 formulates an instruction to adjust the one or more adjustable legs 204 by the size of the needed shift. If the size of the needed shift is below the threshold, position adjustment service 322 formulates an instruction to adjust each minor height adjuster 202 by the size of the needed shift. Position adjustment service 322 may use a threshold when determining whether the rotation of table 200 should be adjusted to the target angle of projection, or whether minor rotation adjusters should be used to rotate projector 102 to the optimal angle. If projector 102 needs to shift a particular amount along the X or Z axis, projector 102 formulates instructions to roll table 200 in the appropriate direction by the appropriate amount. Further, if projector 102 needs to be rotated about the X or Z axis, position adjustment service 322 formulates one or more instructions to adjust one or more of minor height adjusters 202 to accomplish the appropriate rotations.

Position adjustment service 322 may formulate the instructions in any manner within embodiments, including as human-readable instructions and/or as machine-readable instructions.

According to embodiments, instruction display service 382 receives, from instruction transmitter service 324, instructions that position adjustment service 322 formulated based on the determined differences. To illustrate, instruction display service 382 receives, from instruction transmitter service 324, the following human-readable instruction: "Rotate the projector to the right by about 10 degrees."

If display device 380 includes a graphical user interface, then upon receipt of human-readable instructions, instruction display service 382 displays the human-readable instructions at the graphical user interface. Upon receipt of machine-readable instructions, instruction display service 382 may translate the received instructions into human-readable instructions and then displays the human-readable instructions at the graphical user interface.

Figure 9:
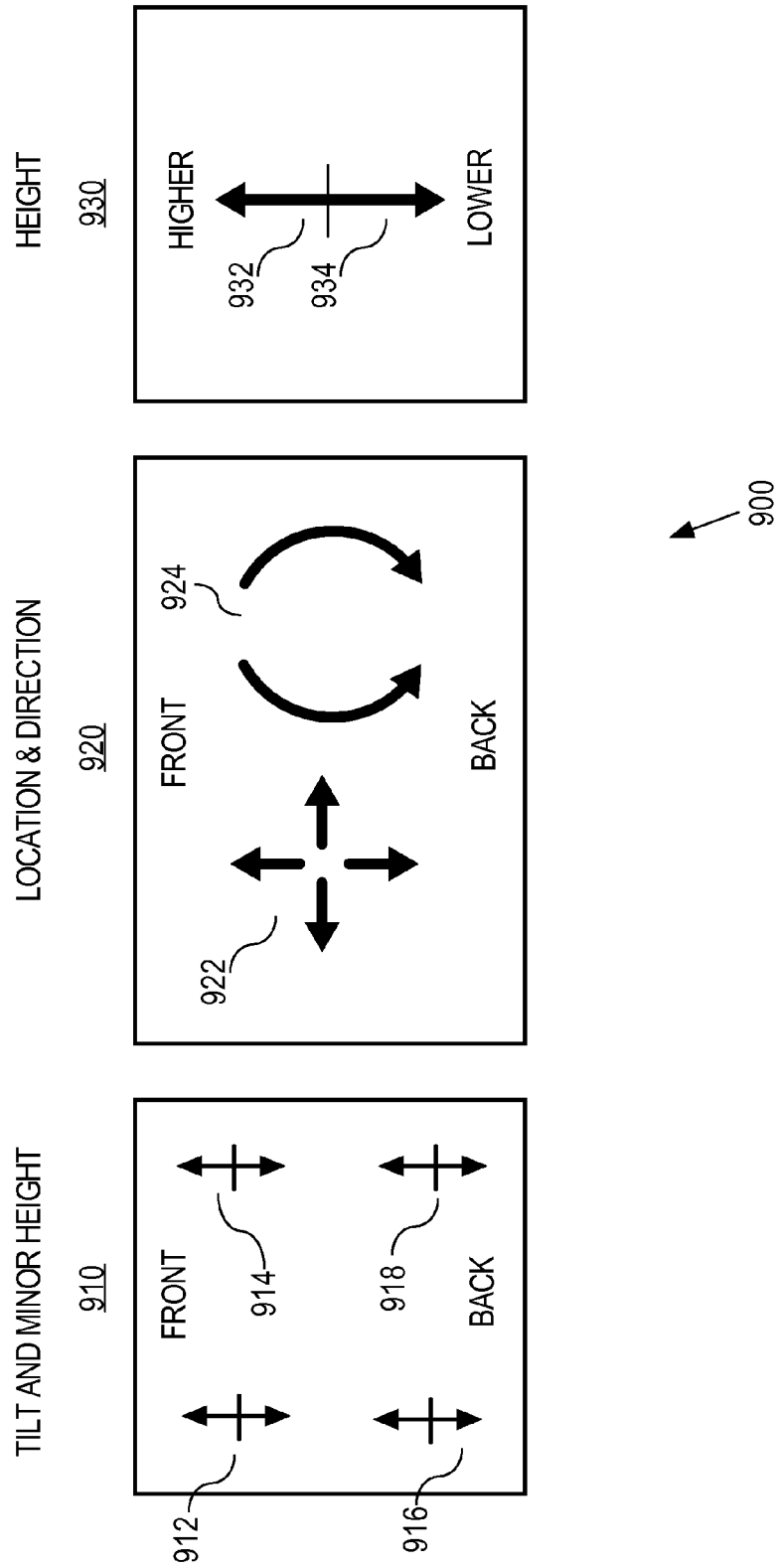
FIG. 9 depicts an example display for a display device.

According to embodiments, display device 380 has a display configured with various indicators, such as example display 900 of FIG. 9. Control set 910 of display 900 includes indicator pairs 912-918, each of which correspond to a minor height adjuster 202 (FIG. 2). Control set 910 assumes four minor height adjusters 202, but embodiments are not limited thereby. Instruction display service 382 lights up the top arrow of an indicator pair, such as indicator pair 912, when the received instructions indicate that the associated minor height adjuster 202 needs to be adjusted higher. Likewise, instruction display service 382 lights up the bottom arrow of an indicator pair if the received instructions indicate that the associated minor height adjuster needs to be adjusted lower. Activation of such indicators instructs the user as to what manual controls need to be adjusted in order to achieve the target position for projector 102.

Control set 920 includes indicators 922 that communicate instructions to a user to move projector 102 along the X or Z axis. To illustrate, instruction display service 382 lights up one or more of the arrows of indicators 922 based on received instructions indicating the need to shift projector 102 along the X and/or Z axis. Control set 920 also includes indicators 924 that indicate, to a user, instructions to rotate projector 102 about the Y axis. For example, instruction display service 382 lights up one or the other curved arrow based on received instructions to rotate projector 102 about the Y axis.

Control set 930 includes indicator 932, which instruction display service 382 lights up if the received instructions indicate that projector 102 needs to shift higher along the Y axis, and indicator 934, which instruction display service 382 lights up if the received instructions indicate that projector 102 needs to shift lower along the Y axis.

In one embodiment, indicators for minor height adjusters 202 are not included in display 900. In this embodiment, the user may choose to adjust minor height adjusters 202 if needed once the image is adjusted based on the results of flowchart 600. In other words, minor height adjusters 202 are left to the user's discretion in this embodiment.

In another embodiment in which computing device 320 is communicatively coupled to projector computing device 310, position adjustment service 322 formulates one or more human-readable instructions for adjusting the current position of projector 102 to the target position for projector 102 based, at least in part, on the determined differences between the current position of projector 102 and the target position for projector 102. Position adjustment service 322 captures the one or more instructions in an image and causes projector 102 to project the image onto projection surface 104. The image may include guidelines to aid the user visually in adjusting projector 102 to attain an optimal image position, e.g., during minor adjustments, based on the user's discretion, using minor height adjusters 202.

In another embodiment where computing device 320 is communicatively coupled to position adjustment robot 330, position adjustment service 322 formulates one or more instructions for adjusting the current position of projector 102 to the target position for projector 102 based, at least in part, on the determined differences between the current position of projector 102 and the target position for projector 102. These instructions are in a language understood by position adjustment robot 330. Instruction transmitter service 324 transmits the formulated instructions to instruction receiver service 332 at position adjustment robot 330. Instruction implementer service 334 then causes position adjustment robot 330 to perform adjustments to the position of projector 102 indicated in the received instructions. The configuration of position adjustment robot 330 in FIG. 3 and the described interactions between position adjustment robot 330 and computing device 320 are illustrative and non-limiting.

In yet another embodiment where computing device 320 is integrated with position adjustment robot 330, position adjustment service 322 causes position adjustment robot 330 to adjust the current position of projector 102 to be the target position for projector 102 based, at least in part, on the determined differences between the current position of projector 102 and the target position for projector 102. According to a particular implementation, position adjustment robot 330 performs movements corresponding to each determined difference between the current position of projector 102 and the target position for projector 102 in order to place projector 102 in the target position.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
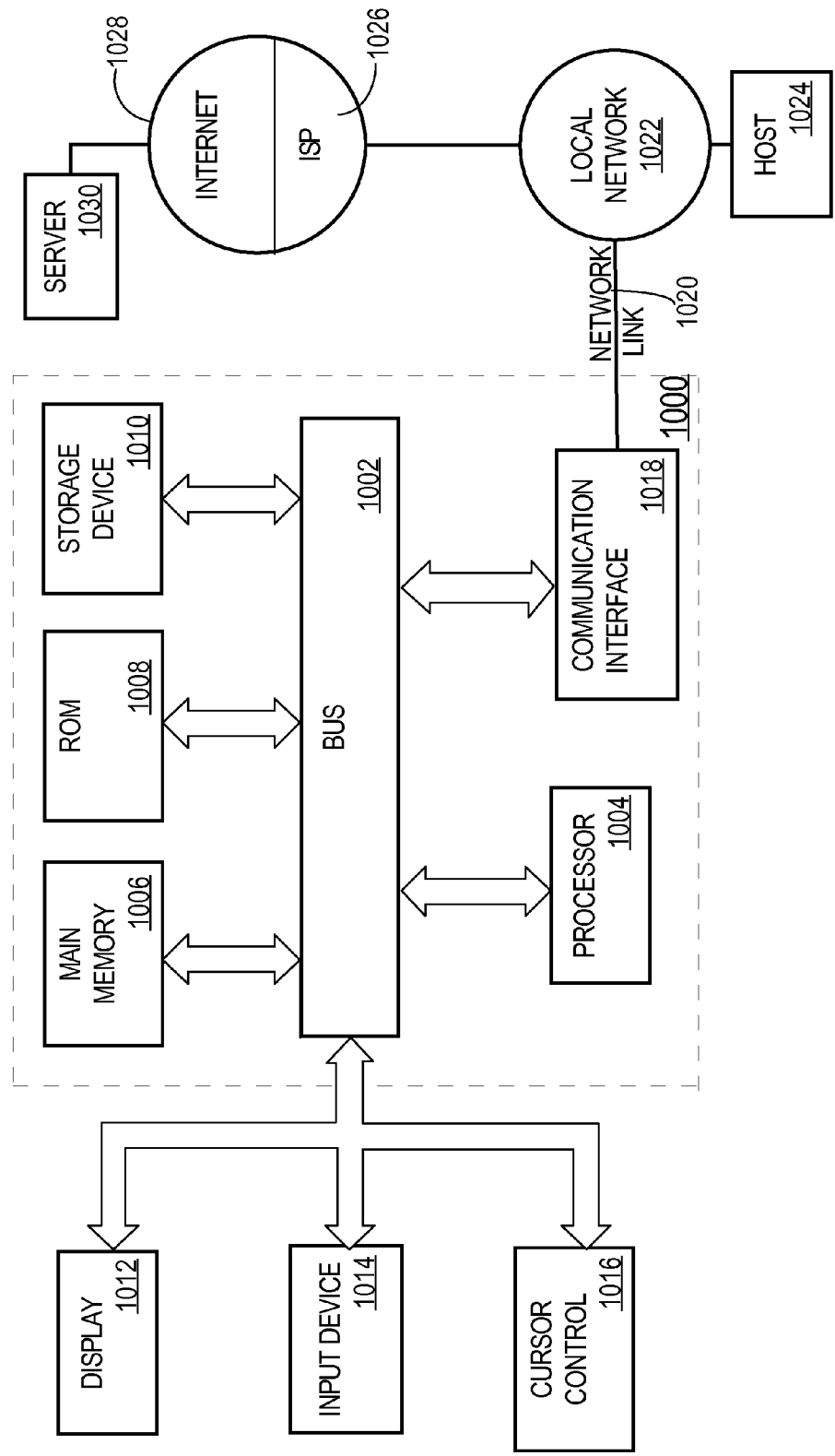
FIG. 10 is a block diagram of a computer system on which embodiments may be implemented.

For example, FIG. 10 is a block diagram that depicts a computer system 1000 upon which an embodiment may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), a Liquid Crystal Display (LCD), a Light-Emitting Diode (LED) monitor, etc., for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computing device comprising:
   one or more sensors that have a known spatial relationship with a projector; and
   a position adjustment service configured to:
      identify, based at least in part on the known spatial relationship between the one or more sensors and the projector, a current position of the projector relative to positions of a plurality of reference points that define a projection surface,
      determine a target position for the projector,
      determine one or more differences between the current position of the projector and the target position for the projector,
      perform one or more actions based upon the determined one or more differences between the current position of the projector and the target position for the projector, and
      retrieve information indicating a center of projection for the projector,
      wherein identifying the target position for the projector is based on the current position of the projector, and the information indicating the center of projection for the projector.

2. The computing device of claim 1, wherein:
   the computing device is communicatively coupled to a display device; and
   the one or more actions comprise:
      formulating one or more instructions for adjusting the current position of the projector to the target position for the projector based, at least in part, on the determined one or more differences between the current position of the projector and the target position for the projector; and
      causing the one or more instructions to be displayed at the display device.

3. The computing device of claim 1, wherein:
   the computing device is communicatively coupled to the projector; and
   the one or more actions comprise:
      formulating one or more instructions for adjusting the current position of the projector to the target position for the projector based, at least in part, on the determined one or more differences between the current position of the projector and the target position for the projector;
      capturing the one or more instructions in an instructions image; and
      causing the instructions image to be projected by the projector.

4. The computing device of claim 1, wherein:
   the computing device is communicatively coupled to a projector position adjusting robot; and
   the one or more actions comprise instructing the projector position adjusting robot to adjust the current position of the projector to be the target position for the projector based, at least in part, on the determined one or more differences between the current position of the projector and the target position for the projector.

5. The computing device of claim 1, wherein:
   the computing device further comprises a projector position adjusting robot; and
   the one or more actions comprise causing the projector position adjusting robot to adjust the current position of the projector to be the target position for the projector based, at least in part, on the determined one or more differences between the current position of the projector and the target position for the projector.

6. A computing device comprising:
   one or more sensors that have a known spatial relationship with a projector; and
   a position adjustment service configured to:
      identify, based at least in part on the known spatial relationship between the one or more sensors and the projector, a current position of the projector relative to positions of a plurality of reference points that define a projection surface,
      determine a target position for the projector,
      determine one or more differences between the current position of the projector and the target position for the projector, and perform one or more actions based upon the determined one or more differences between the current position of the projector and the target position for the projector;

wherein the one or more sensors are embedded in a projector stand; and wherein the projector stand comprises a projector-stabilizing member configured to maintain the projector in the known spatial relationship with the one or more sensors.

7. A computing device comprising:
one or more sensors that have a known spatial relationship with a projector; and
a position adjustment service configured to:
identify, based at least in part on the known spatial relationship between the one or more sensors and the projector, a current position of the projector relative to positions of a plurality of reference points that define a projection surface,
determine a target position for the projector,
determine one or more differences between the current position of the projector and the target position for the projector, and
perform one or more actions based upon the determined one or more differences between the current position of the projector and the target position for the projector;
wherein the target position comprises an optimal distance attribute that indicates an optimal distance between the projector and the projection surface; and
wherein the position adjustment service is further configured to:
retrieve projector information indicating:
a maximum size of a projected image for the projector, and
a certain distance between the projection surface and the projector for the maximum size of the projected image;
calculate a bounding box for the projected image based, at least in part, on the positions of the plurality of reference points that define the projection surface;
identify a target area, for the projected image, that is within the bounding box;
wherein the target area is at most the maximum size of the projected image; and
calculate the optimal distance attribute of the target position based, at least in part, on the target area for the projected image and the certain distance in the retrieved projector information.

8. The computing device of claim 7, wherein the target position is a position at which a projected image from the projector has the largest possible size, which is less than a maximum size of a projected image for the projector and within the bounding box calculated, based, at least in part, on the positions of the plurality of reference points that define the projection surface.

9. One or more non-transitory computer-readable media storing instructions which, when processed by one or more processors, cause:
a position adjustment service executing on a computing device to:
identify, based at least in part on a known spatial relationship between one or more sensors and a projector, a current position of the projector relative to positions of a plurality of reference points that define a projection surface,
determine a target position for the projector,
determine one or more differences between the current position of the projector and the target position for the projector,
perform one or more actions based upon the determined one or more differences between the current position of the projector and the target position for the projector, and
retrieve information indicating a center of projection for the projector,
wherein identifying the target position for the projector is based on the current position of the projector, and the information indicating the center of projection for the projector.

10. The one or more non-transitory computer-readable media of claim 9, wherein:
the computing device is communicatively coupled to a display device; and
the one or more actions comprise:
formulating one or more instructions for adjusting the current position of the projector to the target position for the projector based, at least in part, on the determined one or more differences between the current position of the projector and the target position for the projector; and
causing the one or more instructions to be displayed at the display device.

11. The one or more non-transitory computer-readable media of claim 9, wherein:
the computing device is communicatively coupled to the projector; and
the one or more actions comprise:
formulating one or more instructions for adjusting the current position of the projector to the target position for the projector based, at least in part, on the determined one or more differences between the current position of the projector and the target position for the projector;
capturing the one or more instructions in an instructions image; and
causing the instructions image to be projected by the projector.

12. The one or more non-transitory computer-readable media of claim 9, wherein:
the computing device is communicatively coupled to a projector position adjusting robot; and
the one or more actions comprise instructing the projector position adjusting robot to adjust the current position of the projector to be the target position for the projector based, at least in part, on the determined one or more differences between the current position of the projector and the target position for the projector.

13. The one or more non-transitory computer-readable media of claim 9, wherein:
the computing device further comprises a projector position adjusting robot; and
the one or more actions comprise causing the projector position adjusting robot to adjust the current position of the projector to be the target position for the projector based, at least in part, on the determined one or more differences between the current position of the projector and the target position for the projector.

14. One or more non-transitory computer-readable media storing instructions which, when processed by one or more processors, cause:
a position adjustment service executing on a computing device to:

identify, based at least in part on a known spatial relationship between one or more sensors and a projector, a current position of the projector relative to positions of a plurality of reference points that define a projection surface, determine a target position for the projector, determine one or more differences between the current position of the projector and the target position for the projector, and perform one or more actions based upon the determined one or more differences between the current position of the projector and the target position for the projector;

wherein the one or more sensors are embedded in a projector stand; and wherein the projector stand comprises a projector-stabilizing member configured to maintain the projector in the known spatial relationship with the one or more sensors.

15. One or more non-transitory computer-readable media storing instructions which, when processed by one or more processors, cause:

a position adjustment service executing on a computing device to:

identify, based at least in part on a known spatial relationship between one or more sensors and a projector, a current position of the projector relative to positions of a plurality of reference points that define a projection surface, determine a target position for the projector, determine one or more differences between the current position of the projector and the target position for the projector, and perform one or more actions based upon the determined one or more differences between the current position of the projector and the target position for the projector;

wherein the target position comprises an optimal distance attribute that indicates an optimal distance between the projector and the projection surface; and wherein the non-transitory computer-readable media further comprise instructions which, when processed by the one or more processors, cause the position adjustment service to:

retrieve projector information indicating:

a maximum size of a projected image for the projector, and a certain distance between the projection surface and the projector for the maximum size of the projected image;

calculate a bounding box for the projected image based, at least in part, on the positions of the plurality of reference points that define the projection surface;

identify a target area, for the projected image, that is within the bounding box;

wherein the target area is at most the maximum size of the projected image; and calculate the optimal distance attribute of the target position based, at least in part, on the target area for the projected image and the certain distance in the retrieved projector information.

16. The one or more non-transitory computer-readable media of claim 15, wherein the target position is a position at which a projected image from the projector has the largest possible size, which is less than a maximum size of a projected image for the projector and within the bounding box calculated, based, at least in part, on the positions of the plurality of reference points that define the projection surface.

17. A method comprising:

identifying, based at least in part on a known spatial relationship between one or more sensors and a projector, a current position of the projector relative to positions of a plurality of reference points that define a projection surface;

determining a target position for the projector;

determining one or more differences between the current position of the projector and the target position for the projector; and performing one or more actions based upon the determined one or more differences between the current position of the projector and the target position for the projector;

wherein the target position is a position at which a projected image from the projector has the largest possible size, which is less than a maximum size of a projected image for the projector and within a bounding box calculated, based, at least in part, on the positions of the plurality of reference points that define the projection surface.

18. A computing device comprising:

a position adjustment service configured to:

identify, based at least in part on a known spatial relationship between one or more sensors and a projector, a current position of the projector relative to positions of a plurality of reference points that define a projection surface;

determine a target position for the projector;

determine one or more differences between the current position of the projector and the target position for the projector; and perform one or more actions based upon the determined one or more differences between the current position of the projector and the target position for the projector;

wherein the target position is a position at which a projected image from the projector has the largest possible size, which is less than a maximum size of a projected image for the projector and within a bounding box calculated, based, at least in part, on the positions of the plurality of reference points that define the projection surface.

19. One or more non-transitory computer-readable media storing instructions which, when processed by one or more processors, cause:

a position adjustment service executing on a computing device to:

identify, based at least in part on a known spatial relationship between one or more sensors and a projector, a current position of the projector relative to positions of a plurality of reference points that define a projection surface;

determine a target position for the projector;

determine one or more differences between the current position of the projector and the target position for the projector; and perform one or more actions based upon the determined one or more differences between the current position of the projector and the target position for the projector;

wherein the target position is a position at which a projected image from the projector has the largest possible size, which is less than a maximum size of a projected image for the projector and within a bounding box calculated, based, at least in part, on the positions of the plurality of reference points that define the projection surface.

\* \* \* \* \*